US011381640B2

(12) United States Patent
Savalle et al.

(10) Patent No.: US 11,381,640 B2
(45) Date of Patent: Jul. 5, 2022

(54) DETECTION OF ISOLATED CHANGES IN NETWORK METRICS USING SMART-PEERING

(71) Applicant: Cisco Technology, Inc., San Jose, CA (US)

(72) Inventors: Pierre-André Savalle, Rueil-Malmaison (FR); Jean-Philippe Vasseur, Saint Martin d'Uriage (FR); Grégory Mermoud, Veyras VS (CH); Vinay Kumar Kolar, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/875,182

(22) Filed: May 15, 2020

(65) Prior Publication Data

US 2021/0360059 A1 Nov. 18, 2021

(51) Int. Cl.
 *G06F 15/173* (2006.01)
 *H04L 67/104* (2022.01)
 *H04L 41/142* (2022.01)
 *H04L 41/5025* (2022.01)
(52) U.S. Cl.
 CPC ........ *H04L 67/1044* (2013.01); *H04L 41/142* (2013.01); *H04L 41/5025* (2013.01)
(58) Field of Classification Search
 USPC ........................................ 709/223, 224, 225
 See application file for complete search history.

(56) References Cited

U.S. PATENT DOCUMENTS

| 8,381,090 | B2 | 2/2013 | Bruckner et al. |
| 8,966,055 | B2 | 2/2015 | Mittal et al. |
| 9,953,160 | B2 | 4/2018 | Sharma et al. |
| 10,200,901 | B2 * | 2/2019 | Chen ..................... H04W 24/08 |
| 10,210,189 | B2 * | 2/2019 | Anand ................ G06F 11/3409 |
| 10,235,638 | B2 | 3/2019 | Maheshwari et al. |
| 10,587,633 | B2 | 3/2020 | Muddu et al. |
| 10,609,059 | B2 | 3/2020 | Apostolopoulos |
| 2018/0332064 | A1 | 11/2018 | Harris et al. |

(Continued)

OTHER PUBLICATIONS

Mendes, Diego Ximenes, "Detection and Localization of Events in Computer Networks Using End-to-End Measurements Time Series", Dissertation, Nov. 2017, 57 pages, COPPE UFRJ, Rio de Janeiro, Brazil.

(Continued)

*Primary Examiner* — Lan Dai T Truong
(74) *Attorney, Agent, or Firm* — Behmke Innovation Group LLC; Kenneth J. Heywood; Jonathon P. Western

(57) ABSTRACT

In one embodiment, a network assurance service that monitors one or more networks identifies changes in a key performance indicator for each of a plurality of network entities in the one or more networks. The service forms a peer group of network entities from the plurality of network entities whose changes in the key performance indicator are correlated. The service monitors the key performance indicator for network entities in the peer group of network entities. The service, based on the monitoring, detects an anomalous change in the key performance indicator for a particular network entity in the peer group of network entities relative to other network entities in the peer group of network entities.

20 Claims, 8 Drawing Sheets

(56) References Cited

U.S. PATENT DOCUMENTS

| | | | |
|---|---|---|---|
| 2019/0212022 A1* | 7/2019 | Aeberhard | F24F 11/65 |
| 2019/0272376 A1 | 9/2019 | Woland et al. | |
| 2019/0341142 A1 | 11/2019 | Nag et al. | |
| 2020/0092172 A1 | 3/2020 | Kumaran et al. | |
| 2020/0177611 A1* | 6/2020 | Bharrat | H04L 41/142 |
| 2021/0304103 A1* | 9/2021 | Geffen | G06Q 10/06393 |

OTHER PUBLICATIONS

Crovella, et al., "Graph wavelets for spatial traffic analysis", IEEE Infocom 2003. Twenty-second Annual Joint Conference of the IEEE Computer and Communications Societies, Apr. 2003, 10 pages, IEEE.

* cited by examiner

DETECTION OF ISOLATED CHANGES IN NETWORK METRICS USING SMART-PEERING

TECHNICAL FIELD

The present disclosure relates generally to computer networks, and, more particularly, to the detection of isolated changes in network metrics using smart-peering.

BACKGROUND

Networks are large-scale distributed systems governed by complex dynamics and very large number of parameters. In general, network assurance involves applying analytics to captured network information, to assess the health of the network.

Detecting changes in networks is important from a network assurance perspective. For instance, configuration changes in the network can lead to unintended problems, sudden surges in the number of endpoints or clients in parts of the network may lead to load and performance issues, etc. However, there are many key performance indicators (KPIs) that can be monitored in a network, which may all exhibit strong variability. In addition, many significant KPI changes in a network are actually legitimate behaviors. For instance, utilization and load KPIs for the network of a conference venue may increase sharply as patrons enter the venue, which is a perfectly normal behavior.

DESCRIPTION OF EXAMPLE EMBODIMENTS

Overview

Figure 1A:
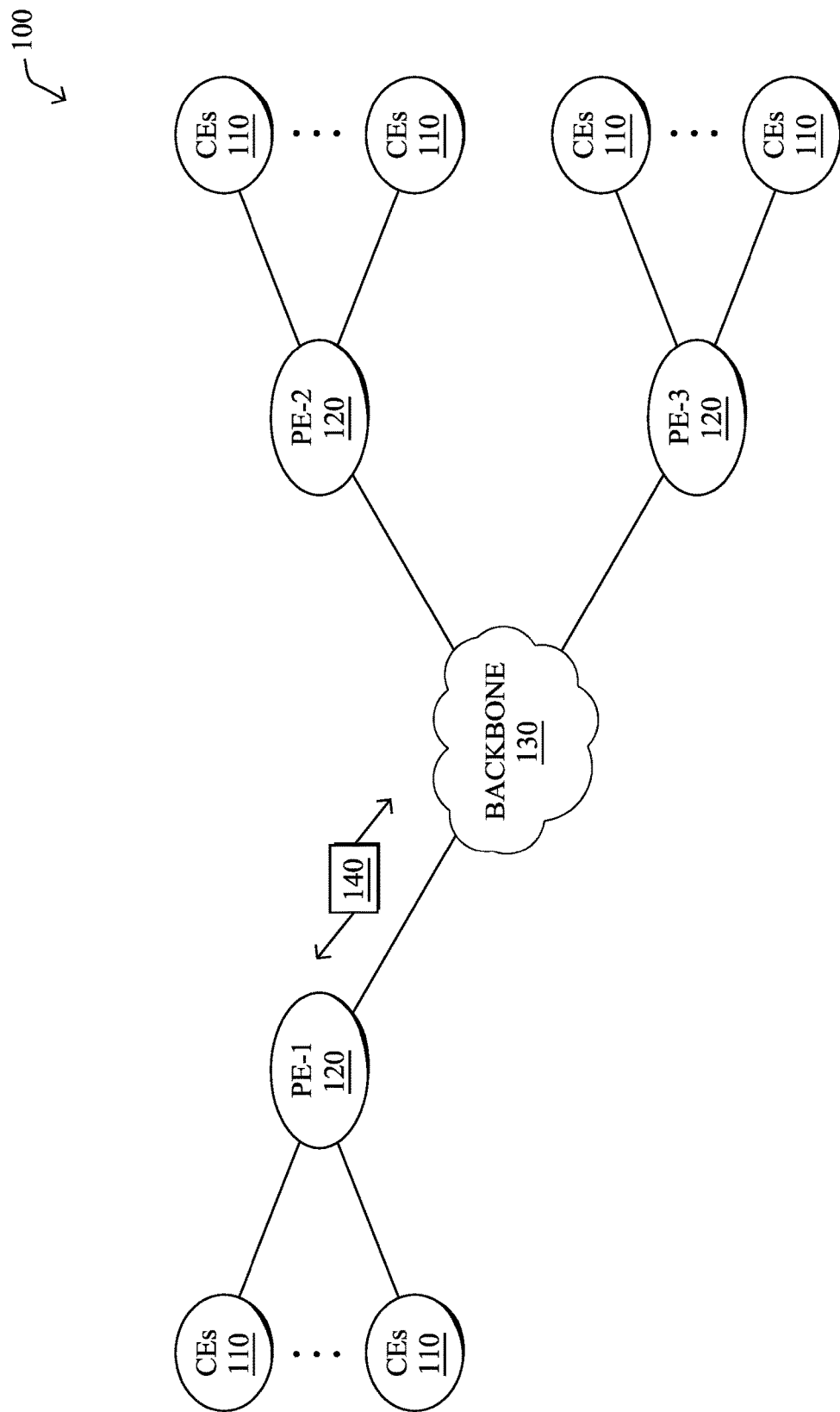
FIGS. 1A-1B illustrate an example communication network.

According to one or more embodiments of the disclosure, a network assurance service that monitors one or more networks identifies changes in a key performance indicator for each of a plurality of network entities in the one or more networks. The service forms a peer group of network entities from the plurality of network entities whose changes in the key performance indicator are correlated. The service monitors the key performance indicator for network entities in the peer group of network entities. The service, based on the monitoring, detects an anomalous change in the key performance indicator for a particular network entity in the peer group of network entities relative to other network entities in the peer group of network entities.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
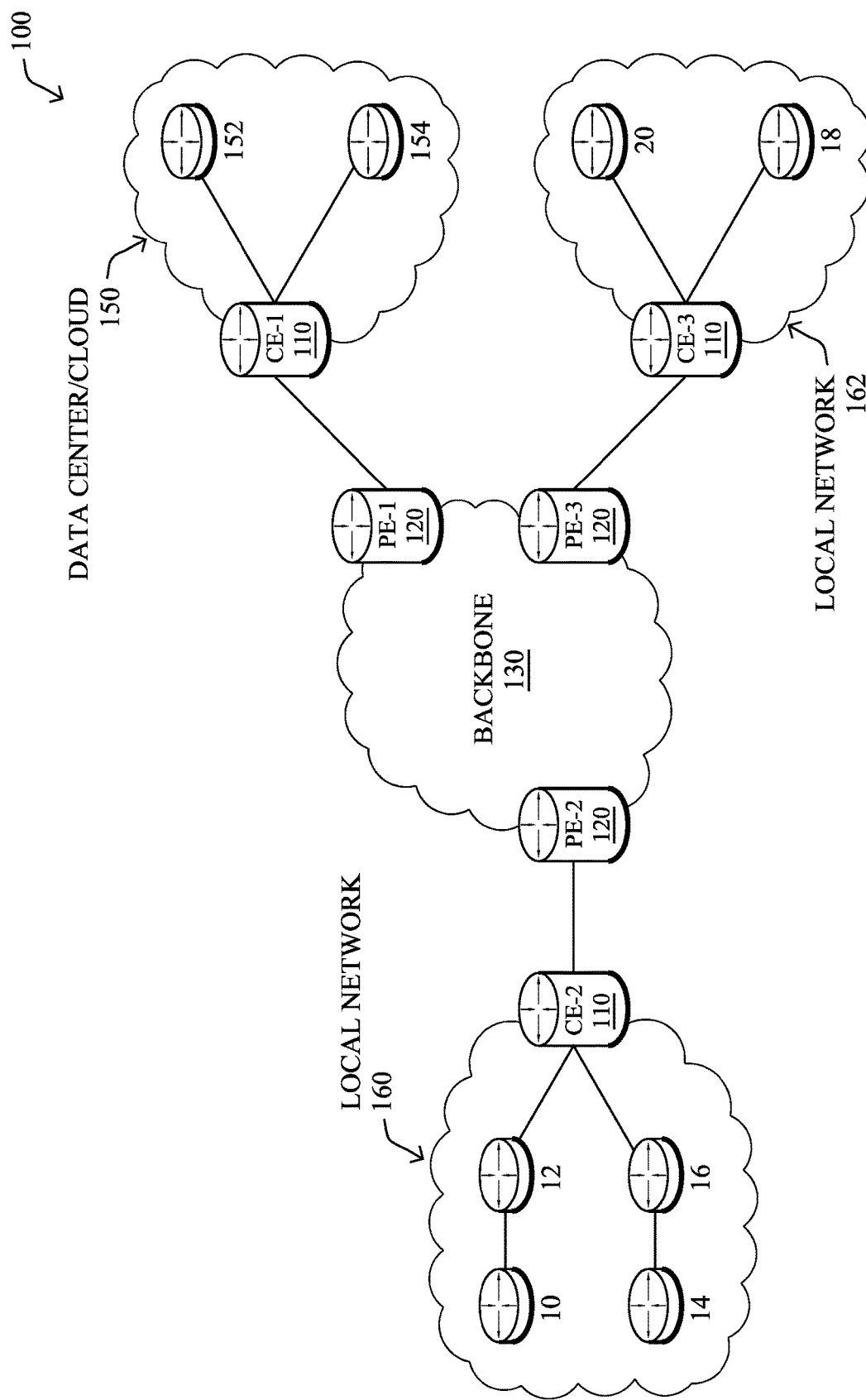

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, an authentication, authorization, and accounting (AAA) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
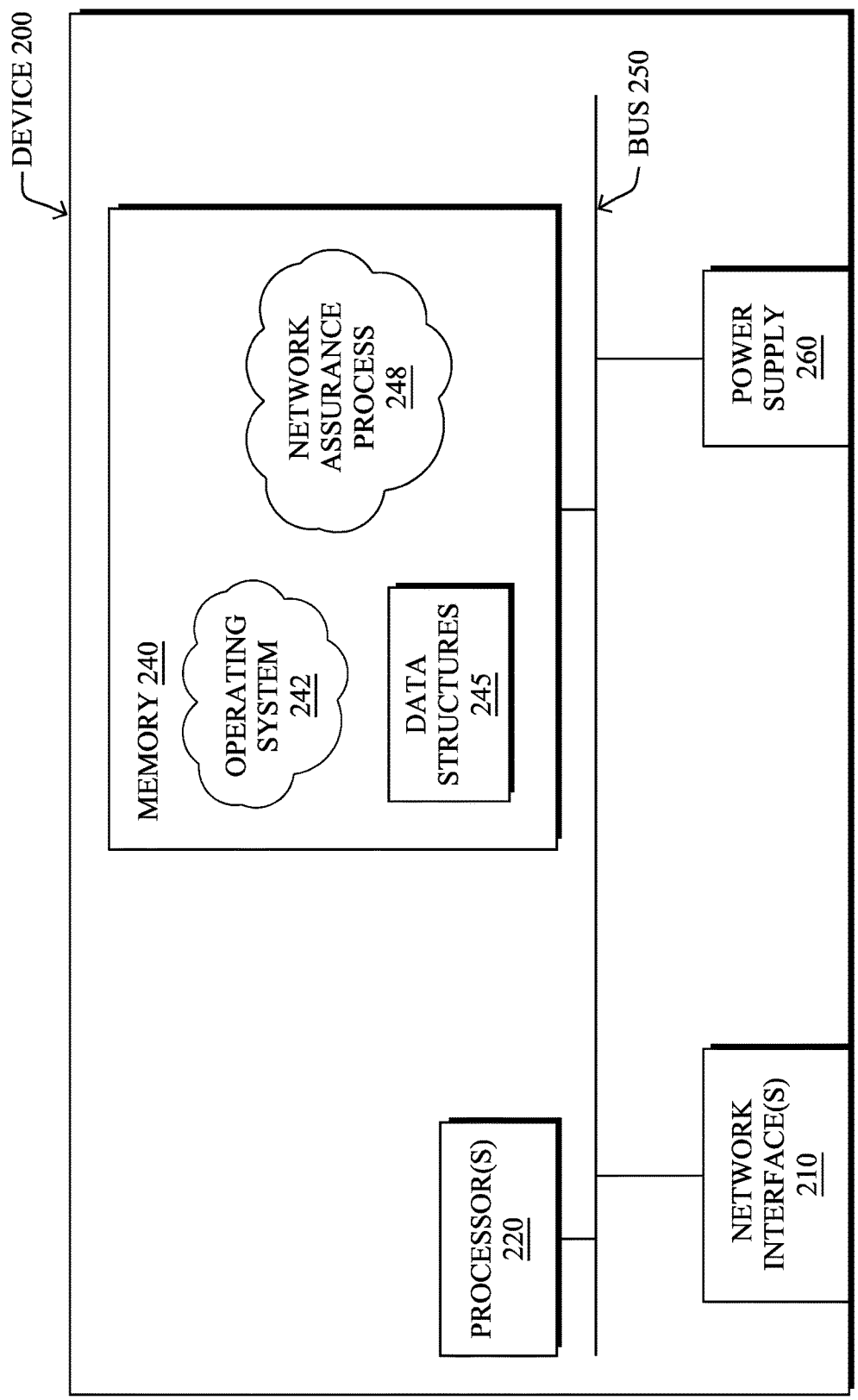
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a network assurance process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Network assurance process 248 includes computer executable instructions that, when executed by processor(s) 220, cause device 200 to perform network assurance functions as part of a network assurance infrastructure within the network. In general, network assurance refers to the branch of networking concerned with ensuring that the network provides an acceptable level of quality in terms of the user experience. For example, in the case of a user participating in a videoconference, the infrastructure may enforce one or more network policies regarding the videoconference traffic, as well as monitor the state of the network, to ensure that the user does not perceive potential issues in the network (e.g., the video seen by the user freezes, the audio output drops, etc.).

In some embodiments, network assurance process 248 may use any number of predefined health status rules, to enforce policies and to monitor the health of the network, in view of the observed conditions of the network. For example, one rule may be related to maintaining the service usage peak on a weekly and/or daily basis and specify that if the monitored usage variable exceeds more than 10% of the per day peak from the current week AND more than 10% of the last four weekly peaks, an insight alert should be triggered and sent to a user interface.

Another example of a health status rule may involve client transition events in a wireless network. In such cases, whenever there is a failure in any of the transition events, the wireless controller may send a reason_code to the assurance service. To evaluate a rule regarding these conditions, the network assurance service may then group 150 failures into different "buckets" (e.g., Association, Authentication, Mobility, DHCP, WebAuth, Configuration, Infra, Delete, De-Authorization) and continue to increment these counters per service set identifier (SSID), while performing averaging every five minutes and hourly. The system may also maintain a client association request count per SSID every five minutes and hourly, as well. To trigger the rule, the system may evaluate whether the error count in any bucket has exceeded 20% of the total client association request count for one hour.

In various embodiments, network assurance process 248 may also utilize machine learning techniques, to enforce policies and/or to monitor the health of the network. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, network assurance process 248 may employ one or more supervised, unsupervised, or semi-supervised machine learning models. Generally, supervised learning entails the use of a training set of data, as noted above, that is used to train the model to apply labels to the input data. For example, the training data may include sample network observations that do, or do not, violate a given network health status rule and are labeled as such. On the other end of the spectrum are unsupervised techniques that do not require a training set of labels. Notably, while a supervised learning model may look for previously seen patterns that have been labeled as such, an unsupervised model may instead look to whether there are sudden changes in the behavior. Semi-supervised learning models take a middle ground approach that uses a greatly reduced set of labeled training data.

Example machine learning techniques that network assurance process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) ANNs (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of times the model incorrectly predicted whether a network health status rule was violated. Conversely, the false negatives of the model may refer to the number of times the model predicted that a health status rule was not violated when, in fact, the rule was violated. True negatives and positives may refer to the number of times the model correctly predicted whether a rule was violated or not violated, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

Figure 3:
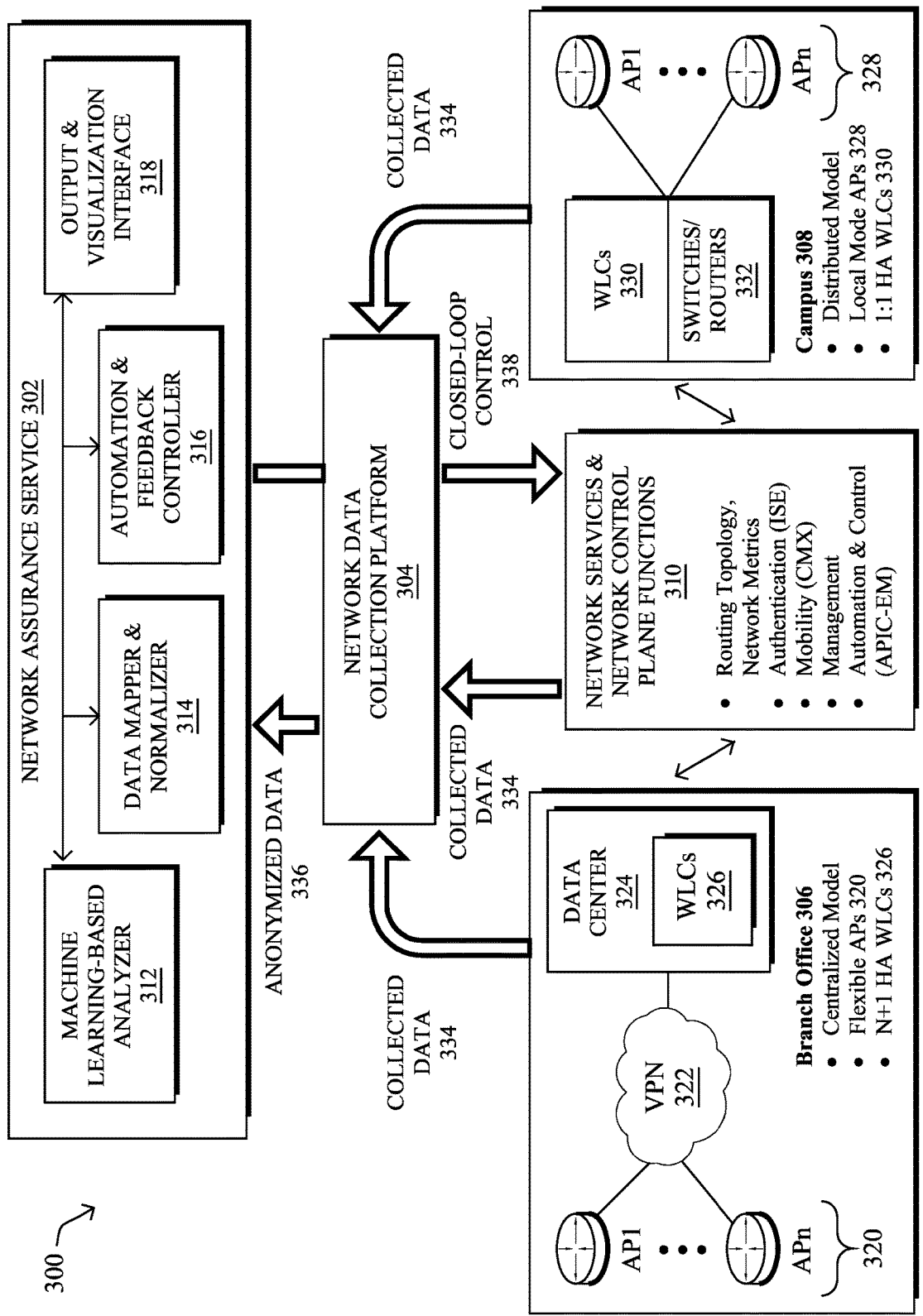
FIG. 3 illustrates an example network assurance system.

FIG. 3 illustrates an example network assurance system 300, according to various embodiments. As shown, at the core of network assurance system 300 may be a network assurance service 302 (e.g., a specifically configured device, such as device 200) that leverages machine learning in support of cognitive analytics for the network, predictive analytics (e.g., models used to predict user experience, etc.), troubleshooting with root cause analysis, and/or trending analysis for capacity planning. Generally, architecture 300 may support both wireless and wired network, as well as LLNs/IoT networks. Typically, network assurance service 302 may be located in the cloud. However, other embodiments provider for network assurance service 302 to be implemented in a data center or in the network undergoing monitoring.

In various embodiments, network assurance service 302 may oversee the operations of the network of an entity (e.g., a company, school, etc.) that includes any number of local networks. For example, network assurance service 302 may oversee the operations of the local networks of any number of branch offices (e.g., branch office 306) and/or campuses (e.g., campus 308) that may be associated with the entity. Data collection from the various local networks/locations may be performed by a network data collection platform 304 that communicates with both network assurance service 302 and the monitored network of the entity.

The network of branch office 306 may include any number of wireless access points 320 (e.g., a first access point API through nth access point, APn) through which endpoint nodes may connect. Access points 320 may, in turn, be in communication with any number of wireless LAN controllers (WLCs) 326 (e.g., supervisory devices that provide control over APs) located in a centralized datacenter 324. For example, access points 320 may communicate with WLCs 326 via a VPN 322 and network data collection platform 304 may, in turn, communicate with the devices in datacenter 324 to retrieve the corresponding network feature data from access points 320, WLCs 326, etc. In such a centralized model, access points 320 may be flexible access points and WLCs 326 may be N+1 high availability (HA) WLCs, by way of example.

Conversely, the local network of campus 308 may instead use any number of access points 328 (e.g., a first access point API through nth access point APm) that provide connectivity to endpoint nodes, in a decentralized manner. Notably, instead of maintaining a centralized datacenter, access points 328 may instead be connected to distributed WLCs 330 and switches/routers 332. For example, WLCs 330 may be 1:1 HA WLCs and access points 328 may be local mode access points, in some implementations.

To support the operations of the network, there may be any number of network services and control plane functions 310. For example, functions 310 may include routing topology and network metric collection functions such as, but not limited to, routing protocol exchanges, path computations, monitoring services (e.g., NetFlow or IPFIX exporters), etc. Further examples of functions 310 may include authentication functions, such as by an Identity Services Engine (ISE) or the like, mobility functions such as by a Connected Mobile Experiences (CMX) function or the like, management functions, and/or automation and control functions such as by an APIC-Enterprise Manager (APIC-EM).

During operation, network data collection platform 304 may receive a variety of data feeds that convey collected data 334 from the devices of branch office 306 and campus 308, as well as from network services and network control plane functions 310. Example data feeds may comprise, but are not limited to, management information bases (MIBS) with Simple Network Management Protocol (SNMP)v2, JavaScript Object Notation (JSON) Files (e.g., WSA wireless, etc.), NetFlow/IPFIX records, logs reporting in order to collect rich datasets related to network control planes (e.g., Wi-Fi roaming, join and authentication, routing, QoS, PHY/MAC counters, links/node failures), traffic characteristics, and other such telemetry data regarding the monitored network. As would be appreciated, network data collection platform 304 may receive collected data 334 on a push and/or pull basis, as desired. Network data collection platform 304 may prepare and store the collected data 334 for processing by network assurance service 302. In some cases, network data collection platform may also anonymize collected data 334 before providing the anonymized data 336 to network assurance service 302.

In some cases, network assurance service 302 may include a data mapper and normalizer 314 that receives the collected and/or anonymized data 336 from network data collection platform 304. In turn, data mapper and normalizer 314 may map and normalize the received data into a unified data model for further processing by network assurance service 302. For example, data mapper and normalizer 314 may extract certain data features from data 336 for input and analysis by network assurance service 302.

In various embodiments, network assurance service 302 may include a machine learning (ML)-based analyzer 312 configured to analyze the mapped and normalized data from data mapper and normalizer 314. Generally, analyzer 312 may comprise a power machine learning-based engine that is able to understand the dynamics of the monitored network, as well as to predict behaviors and user experiences, thereby allowing network assurance service 302 to identify and remediate potential network issues before they happen.

Machine learning-based analyzer 312 may include any number of machine learning models to perform the techniques herein, such as for cognitive analytics, predictive analysis, and/or trending analytics as follows:

Cognitive Analytics Model(s): The aim of cognitive analytics is to find behavioral patterns in complex and unstructured datasets. For the sake of illustration, analyzer 312 may be able to extract patterns of Wi-Fi roaming in the network and roaming behaviors (e.g., the "stickiness" of clients to APs 320, 328, "ping-pong" clients, the number of visited APs 320, 328, roaming triggers, etc.). Analyzer 312 may characterize such patterns by the nature of the device (e.g., device type, OS) according to the place in the network, time of day, routing topology, type of AP/WLC, etc., and potentially correlated with other network metrics (e.g., application, QoS, etc.). In another example, the cognitive analytics model(s) may be configured to extract AP/WLC related patterns such as the number of clients, traffic throughput as a function of time, number of roaming processed, or the like, or even end-device related patterns (e.g., roaming patterns of iPhones, IoT Healthcare devices, etc.).

Predictive Analytics Model(s): These model(s) may be configured to predict user experiences, which is a significant paradigm shift from reactive approaches to network health. For example, in a Wi-Fi network, analyzer 312 may be configured to build predictive models for the joining/roaming time by taking into account a large plurality of parameters/observations (e.g., RF variables, time of day, number of clients, traffic load, DHCP/DNS/Radius time, AP/WLC loads, etc.). From this, analyzer 312 can detect potential network issues before they happen. Furthermore, should abnormal joining time be predicted by analyzer 312, cloud service 312 will be able to identify the major root cause of this predicted condition, thus allowing network assurance service 302 to remedy the situation before it occurs. The predictive analytics model(s) of analyzer 312 may also be able to predict other metrics such as the expected throughput for a client using a specific application. In yet another example, the predictive analytics model(s) may predict the user experience for voice/video quality using network variables (e.g., a predicted user rating of 1-5 stars for a given session, etc.), as function of the network state. As would be appreciated, this approach may be far superior to traditional approaches that rely on a mean opinion score (MOS). In contrast, network assurance service 302 may use the predicted user experiences from analyzer 312 to provide information to a network administrator or architect in real-time and enable closed loop control over the network by network assurance service 302, accordingly. For example, network assurance service 302 may signal to a particular type of endpoint node in branch office 306 or campus 308 (e.g., an iPhone, an IoT healthcare device, etc.) that better QoS will be achieved if the device switches to a different AP 320 or 328.

Trending Analytics Model(s): The trending analytics model(s) may include multivariate models that can predict future states of the network, thus separating noise from actual network trends. Such predictions can be used, for example, for purposes of capacity planning and other "what-if" scenarios.

Machine learning-based analyzer 312 may be specifically tailored for use cases in which machine learning is the only viable approach due to the high dimensionality of the dataset and patterns cannot otherwise be understood and learned. For example, finding a pattern so as to predict the actual user experience of a video call, while taking into account the nature of the application, video CODEC parameters, the states of the network (e.g., data rate, RF, etc.), the current observed load on the network, destination being reached, etc., is simply impossible using predefined rules in a rule-based system.

Unfortunately, there is no one-size-fits-all machine learning methodology that is capable of solving all, or even most, use cases. In the field of machine learning, this is referred to as the "No Free Lunch" theorem. Accordingly, analyzer 312 may rely on a set of machine learning processes that work in conjunction with one another and, when assembled, operate as a multi-layered kernel. This allows network assurance system 300 to operate in real-time and constantly learn and adapt to new network conditions and traffic characteristics. In other words, not only can system 300 compute complex patterns in highly dimensional spaces for prediction or behavioral analysis, but system 300 may constantly evolve according to the captured data/observations from the network.

Network assurance service 302 may also include output and visualization interface 318 configured to provide sensory data to a network administrator or other user via one or more user interface devices (e.g., an electronic display, a keypad, a speaker, etc.). For example, interface 318 may present data indicative of the state of the monitored network, current or predicted issues in the network (e.g., the violation of a defined rule, etc.), insights or suggestions regarding a given condition or issue in the network, etc. Network assurance service 302 may also receive input parameters from the user via interface 318 that control the operation of system 300 and/or the monitored network itself. For example, interface 318 may receive an instruction or other indication to adjust/retrain one of the models of analyzer 312 from interface 318 (e.g., the user deems an alert/rule violation as a false positive).

In various embodiments, network assurance service 302 may further include an automation and feedback controller 316 that provides closed-loop control instructions 338 back to the various devices in the monitored network. For example, based on the predictions by analyzer 312, the evaluation of any predefined health status rules by network assurance service 302, and/or input from an administrator or other user via input 318, controller 316 may instruct an endpoint client device, networking device in branch office 306 or campus 308, or a network service or control plane function 310, to adjust its operations (e.g., by signaling an endpoint to use a particular AP 320 or 328, etc.).

As noted above, a network assurance system/service may leverage machine learning to detect anomalies and outlier behavior among a collection of networking entities (e.g., APs, AP controllers, switches, routers, tunnels, links, etc.) based on any number of observed measurements/key performance indicators (KPIs). These KPIs may include, for example, metrics like utilization, client count, throughput, traffic, loss, latency, jitter, or any other measurement from a network that can indicate entity performance.

The detection of problems in a network based on KPIs can be quite challenging, as there are a lot of KPIs in a typical network and associated data (e.g., logs, configurations, etc.) that may all exhibit strong variability. In addition, significant KPI changes are rather common in a network and legitimate. For instance, consider a shop, hotel, or conference venue. Many KPIs relating to utilization and load would increase frequently as patrons come in in groups and decrease back after a while. This may be visible at many network entities (e.g., multiple wireless access points, AAA/DFICP servers, etc.) at the same time. These events are legitimate and do not constitute interesting insights in these contexts and should not be reported as alerts by the network assurance service. Indeed, such events are the consequence of the normal activity of the business and not really 'seasonal' in the usual sense and can depend on a variety of exogenous effects, not simply time. As a consequence, seasonality modeling cannot be used to help filter out such events.

In another example, configuration changes are routinely rolled out to various network entities in a network. A network assurance service should focus on unexpected and unexplainable changes and, ideally, should not report on changes that are performed by the network administrators themselves. In practice, configuration changes can impact KPIs in ways difficult to understand and the system cannot rely on "knowing" that this is an intended user-initiated, change. In other circumstance, a user-triggered change may lead to KPI changes that they might not have expected.

Detection of Isolated Changes in Network Metrics Using Smart Peering

The techniques herein help to reduce unwanted alerts by a network assurance service by focusing on the detection of isolated changes (e.g., impacting only a small number of similar network entities). In some aspects, this can be achieved by assigning to each network entity a set of peers and by comparing the magnitude of KPI changes for an entity relative to those of its peers. When a KPI for the entity changes a lot while the KPI did not change as much for its peers, the service may report a change event. In further aspects, machine learning can be leveraged learn how peers can be identified, allowing the network assurance service to identify peers for new entities in the network, as well.

Specifically, according to one or more embodiments of the disclosure as described in detail below, a network assurance service that monitors one or more networks identifies changes in a key performance indicator for each of a plurality of network entities in the one or more networks. The service forms a peer group of network entities from the plurality of network entities whose changes in the key performance indicator are correlated. The service monitors the key performance indicator for network entities in the peer group of network entities. The service, based on the monitoring, detects an anomalous change in the key performance indicator for a particular network entity in the peer group of network entities relative to other network entities in the peer group of network entities.

Illustratively, the techniques described herein may be performed by hardware, software, and/or firmware, such as in accordance with the network assurance process 248, which may include computer executable instructions executed by the processor 220 (or independent processor of interfaces 210) to perform functions relating to the techniques described herein.

Operationally, the techniques introduced herein propose comparing the KPI changes of a network entity to those of its peers, which acts as a normalization proxy for how interesting the event may be to a network administrator. Indeed, if the KPI changes for the network entity hut not for its peers, this change is much more unexpected and potentially of greater interest to a network administrator.

Figure 4:
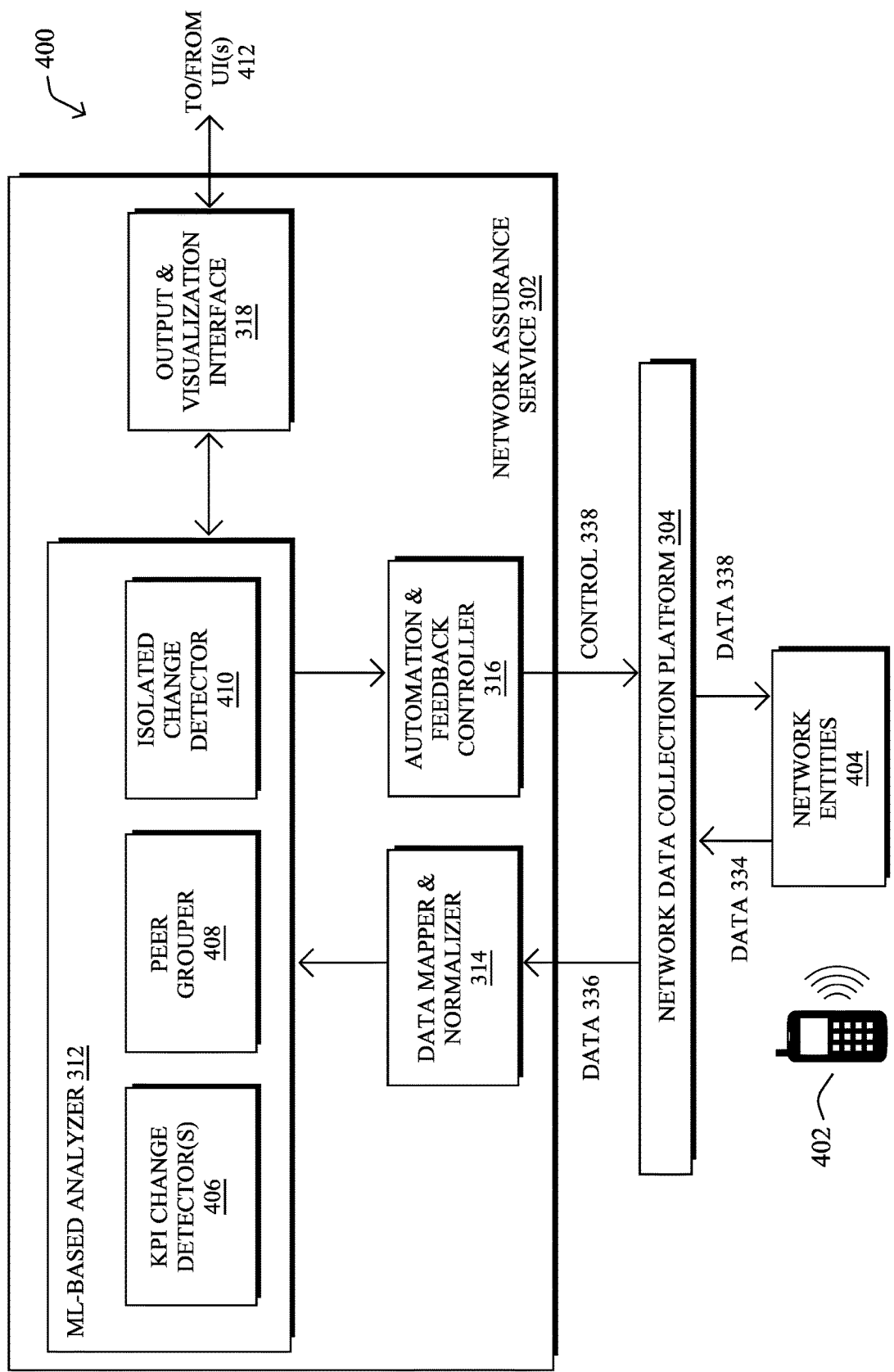
FIG. 4 illustrates an example architecture for detecting isolated changes in network metrics using smart-peering.

FIG. 4 illustrates an example architecture 400 detecting isolated changes in network metrics using smart-peering, according to various embodiments. At the core of architecture 400 may be the following components: one or more KPI change detectors 406 or other machine learning models, a peer grouper 408, and an isolated changed detector 410. In some implementations, the components 406-410 of architecture 400 may be implemented within a network assurance system, such as system 300 shown in FIG. 3. Accordingly, the components 406-410 of architecture 400 shown may be implemented as part of network assurance service 302 (e.g., as part of machine learning-based analyzer 312 and/or output and visualization interface 318), as part of network data collection platform 304, and/or on one or more network elements/entities 404 that communicate with one or more client devices 402 within the monitored network itself. Further, these components 406-410 may be implemented in a distributed manner or implemented as its own stand-alone service, either as part of the local network under observation or as a remote service. In addition, the functionalities of the components of architecture 400 may be combined, omitted, or implemented as part of other processes, as desired.

During operation, service 302 may receive telemetry data from the monitored network (e.g., anonymized data 336 and/or data 334) and, in turn, assess the data using ML-based analyzer 312. From this analysis, network assurance service 302 may raise alerts to UI(s) 412 or provide other information regarding the monitored network(s) for review by a user.

As would be appreciated, network entities 404 may comprise networking equipment used to support the network, such as APs, WLCs or other wireless access point controllers, switches, routers, or the like. In some embodiments, network entities 404 may also include logical components of the network. For instance, in the case of a monitored software defined WAN (SD-WAN) or other network, network entities 404 may comprise tunnels, links, or the like, as well. In some instances, network entities 404 may also include endpoint devices, as well, such as client device 402.

During execution, KPI change detector(s) 406 is responsible for identifying changes in the KPI(s) for each network entity 404 at a specific point in time. This is denoted herein as C(KPI, entity, t). This measure captures the change of the KPI for a given network entity 404 around time point t. For instance:

C(KPI, entity, t) can be as simple as the absolute difference between the KPI values at time t and t−1, in some cases.

In other cases, KPI change detector(s) 406 may measure the relative change in the KPI, where the difference is normalized by some function of the KPI values at time t and t−1 (e.g., percentage of change compared to the mean, etc.).

KPI change detector(s) 406 can also measure the KPI changes with respect to more than just the previous time point, leveraging more history of that KPI than just the previous time period.

Finally, in some instances, KPI change detector(s) 406 may identify KPI changes in an asymmetric manner. For instance, KPI change detector(s) 406 may focus only on increases for a given KPI by truncating the change measure over negative changes, or by weighting negative and positive changes differently.

Thu above change measures may also be crafted with the help of a subject matter expert (SUE) or can be learned or benchmark using statistical or machine learning techniques. For instance, this can be achieved using a simple family of parametric models and some review by SMEs via UI(s) 412 or by leveraging a training set of synthetic target events as well as random data.

According to various embodiments, architecture 400 may also include peer grouper 408 that is responsible for learning a machine learning model to be used for associating peers to each network entity 404 without any user supervision, which is referred to herein as smart-peering. Note that this peering can be based on a variety of criteria such as:

In one embodiment, two network entities 404 are considered peers if their change measures are correlated. In other words, entities A and B may be considered to be peers if C(KPI, entity A, t) is correlated to C(KPI, entity B, t) in some time window. It is important to stress that this notion of a peer is not concerned with the values of the KPI itself, but with the changes in the KPI over time. For instance, in the case of a conference venue, the client counts of the APs may change at the same time for all APs as people enter the venue, even though the absolute client count may vary drastically (and may vary a lot based on, e.g., mobility patterns).

In some embodiments, the above correlations may also be evaluated in conjunction with additional categorical attributes of network entities 404 (e.g., location such as floor and building, model, software version, etc.) and/or their behavioral features.

Peer grouper 408 may employ a number of different approaches to forming peer groups of network entities 404, in various embodiments. In one embodiment, peer grouper 408 may periodically apply clustering to the network entities 404, to form the peer groups. In a simple case, peer grouper 408 may compute a correlation matrix from the correlations between their change measures and apply a technique such as spectral clustering to the matrix. In other cases, peer grouper 408 may use a different clustering approach by first transforming the correlation matrix into a distance matrix. Similarly, peer grouper 408 can reweight the correlations based on any differences in the categorical and/or behavioral attributes of network entities 404, to also take into account information such as geographical or network hierarchies. In such a case, all members of a resulting cluster may be considered to be mutual peers and the peer relationship is symmetric. However, this approach only allows assigning peers to "existing" entities. Thus, if new network entities 404 appear on the network between runs of peer grouper 408, it will not be able to assign them peers. In many instances, though, this can still be acceptable, as observing the KPIs of a network entity 404 for a length of time before assigning it to a peer group can help to reduce false positives.

In a similar embodiment, peer grouper 408 may represent network entities 404 as vertices of a graph, which may possibly be weighted, and whose edges denote their 'proximity' from a topological standpoint (e.g., geographical distance between APs, number of hops in a network) and/or from a behavioral standpoint (e.g., co-occurrence of events such as failures, reboots, users or endpoints in common). In this case, spectral graph clustering may be used to assign every entity to a peer group.

In yet another embodiment, peer grouper 408 may use machine learning to learn function that matches any network entity as represented by basic features to a set of peers. This can be achieved by using different techniques, such as by learning a low-dimensional embedding from the KPI time-series of the network entity 404. For instance, peer grouper 408 may use an autoencoding neural network to learn a compact representation of every network entity 404 and use this representation to identify peers of that network entity 404.

Figure 5:
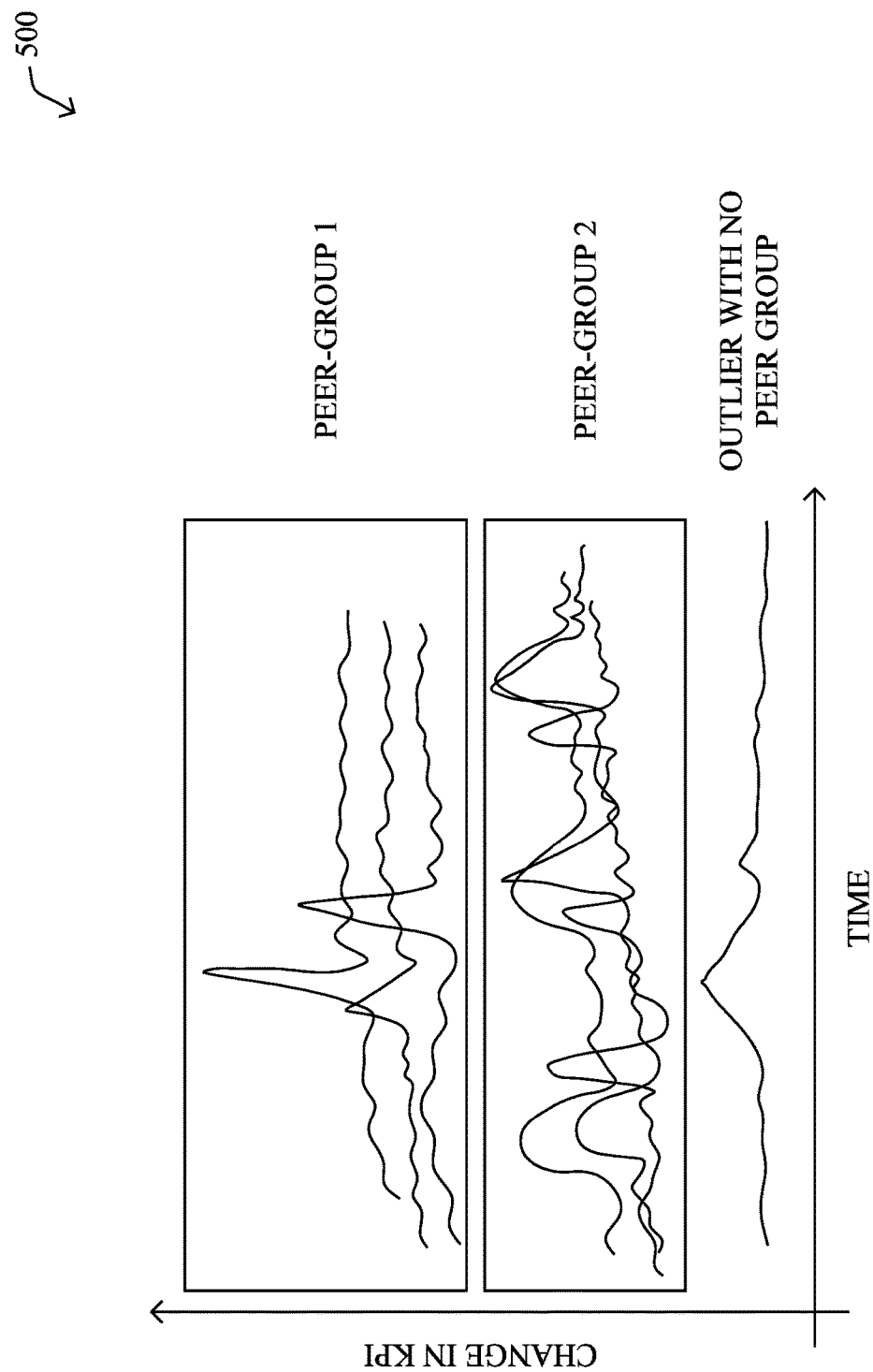
FIG. 5 illustrates an example plot of changes in key performance indicators (KPIs)

In a further embodiment, peer grouper 408 may assess the time-series of KPIs to identify peers of a network entity 404. Here, the goal of peer grouper 408 would be to identify a set of other network entities 404 whose KPI changes are always similar over time. By way of example, consider plot 500 in FIG. 5, which shows the changes in KPIs of a plurality of network entities 404 over time (e.g., over a three-month period). From plot 500, it can be seen that some of the network entities 404 exhibit similar changes in the KPI over time and can be grouped as peer-group 1. Similarly, a second set of the network entities 404 also exhibit similar changes in the KPI over time and may be assigned to peer-group 2. Finally, one of the network entities 404 exhibits KPI changes that are not correlated with those of the other network entities 404 and can be considered an outlier with no peer group. Applying a time-series clustering algorithm to such data can be used to detect these clusters/peer groups, as well as any outliers. In one approach, anomaly alerts can be suppressed with respect to the outlier entities, as there is no clear change pattern with respect to the peers.

Referring again to FIG. 4, another function of peer grouper 408 may be to leverage supervised feedback to train its peering mechanism, in some embodiments. For instance, peer grouper 408 may present pairs of network entities 404 to UI(s) 412 as a side-by-side comparison in terms of their categorical attributes (e.g., in the case of a SD-WAN tunnel, its head and tail country and city, its color, etc.) and/or other quantitative metrics (e.g., loss, latency, jitter). The user must then decide whether these entities should be peered together or not. As peer grouper 408 learns to peer the network entities 404, it will suggest pairs that are increasingly likely to be peers. Here, the underlying model is fully supervised, and a classifier such as a logistic regression or a decision tree may be used by peer grouper 408.

Ideally, the model employed by peer grouper 408 is interpretable enough that one can derive a "peering policy" that has been learned during the peering process. This would allow data regarding such a policy to be provided to UI(s) 412 after each peering decision, allowing the user(s) to assess how the peer groups are formed. Once satisfied with the results, the model can be saved and used by peer grouper 408 for smart-peering in the future.

In various embodiments, architecture 400 may also include isolated change detector 410 that leverages the above mechanisms to detect isolated KPI changes among a peer group. To do so, include isolated change detector 410 may obtain at each dine point, and for each Km and network entity 404, any changes detected by Km change detector(s) 406 and the peers of that entity, as determined by peer grouper 408. In turn, include isolated change detector 410 may then compare the KPI change for the network entity 404 under scrutiny to any KPI changes exhibited by the set of other network entities 404 in its peer group, to see whether that KPI change is anomalous among the peer group.

In some instances, include isolated change detector 410 may rely on simple heuristics to identify isolated/anomalous KPI changes among a peer group of network entities 404. For instance, isolated change detector 410 may compare a KPI change exhibited by a particular network entity 404 to the average or $95^{th}$ percentile of the KPI changes of its peers.

In another embodiment, isolated change detector 410 may identify isolated anomalous changes using a machine learning model. For instance, if some supervision is available (e.g., with some synthetic dataset), isolated change detector 410 may use parametric regression or the like to learn a function whose input consists in the change of the network entity 404 and that of all of its peers.

In a further embodiment, isolated change detector 410 may leverage time-series clustering again, to detect KPI changes for one network entity 404 that does not correlate well with changes exhibited by its peers.

Figure 6:
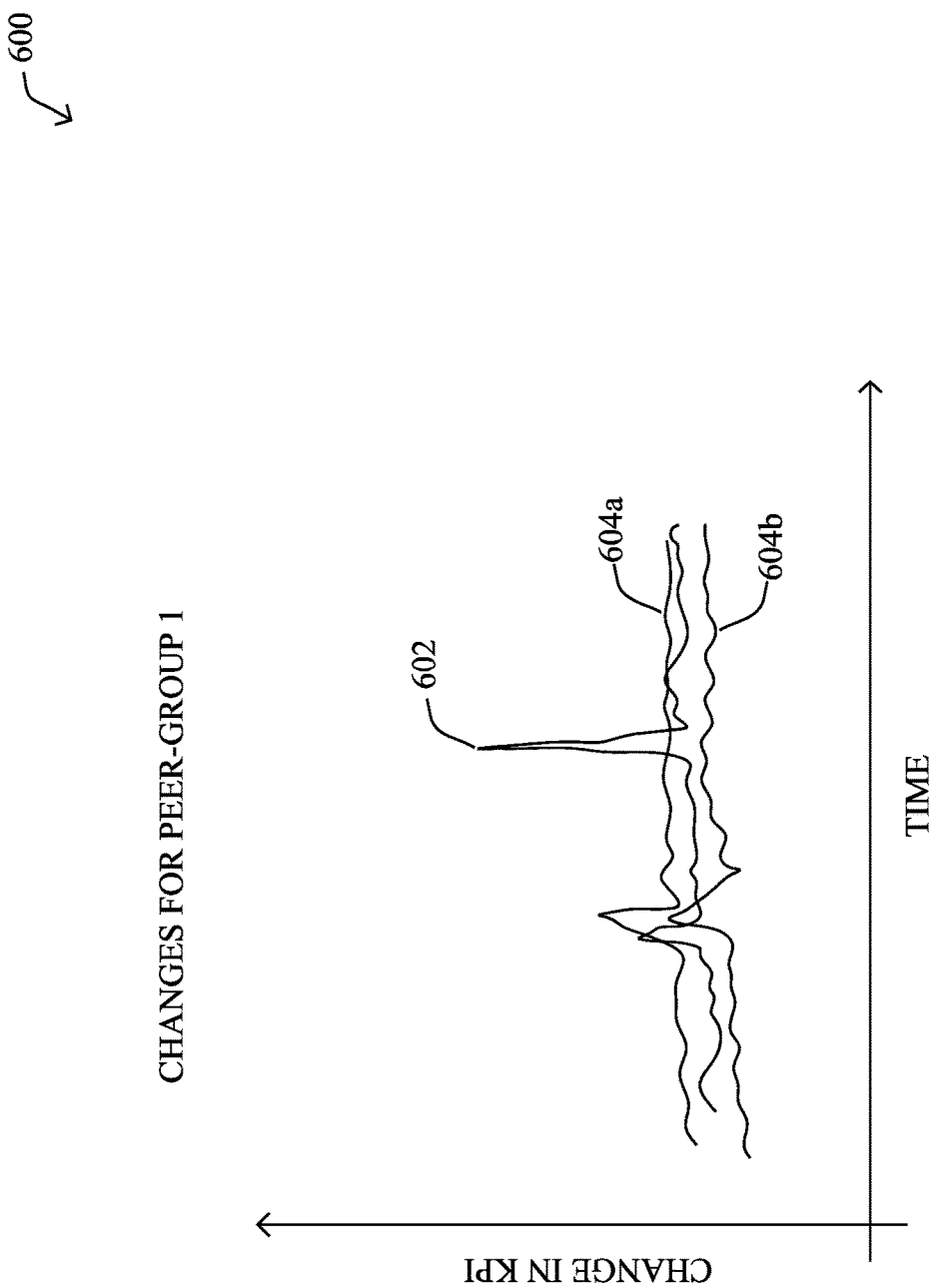
FIG. 6 illustrates an example plot showing an anomalous KPI change in a peer group.

FIG. 6 illustrates an example plot 600 showing an anomalous KPI change in a peer group. More specifically, the changes in a particular KPI for each of a set of peer entities are plotted over time as time-series. As can be seen, spike 602 in plot 600 represents a large change in the KPI exhibited by one of the network entities while its peer entities do not exhibit a correlated spike. Thus, this anomalous KPI change may be flagged and reported to the UI, as it may be of interest to the network administrator.

Identification of point 602 as an isolated/anomalous KPI change by one of the network entities can be achieved in a number of ways. For example, time-series uncertainty bands 604a-604b can be computed for each peer-group using Auto Regressive Integrated Moving Average (ARIMA) or deep-neural network time-series models, such as Deep-AR, and entities with anomalous changes can be tagged as isolated changes with respect to peers. In both cases, the output is a score (or binary decision) indicating whether an event should be raised for that KPI, entity, and time point.

Figure 7:
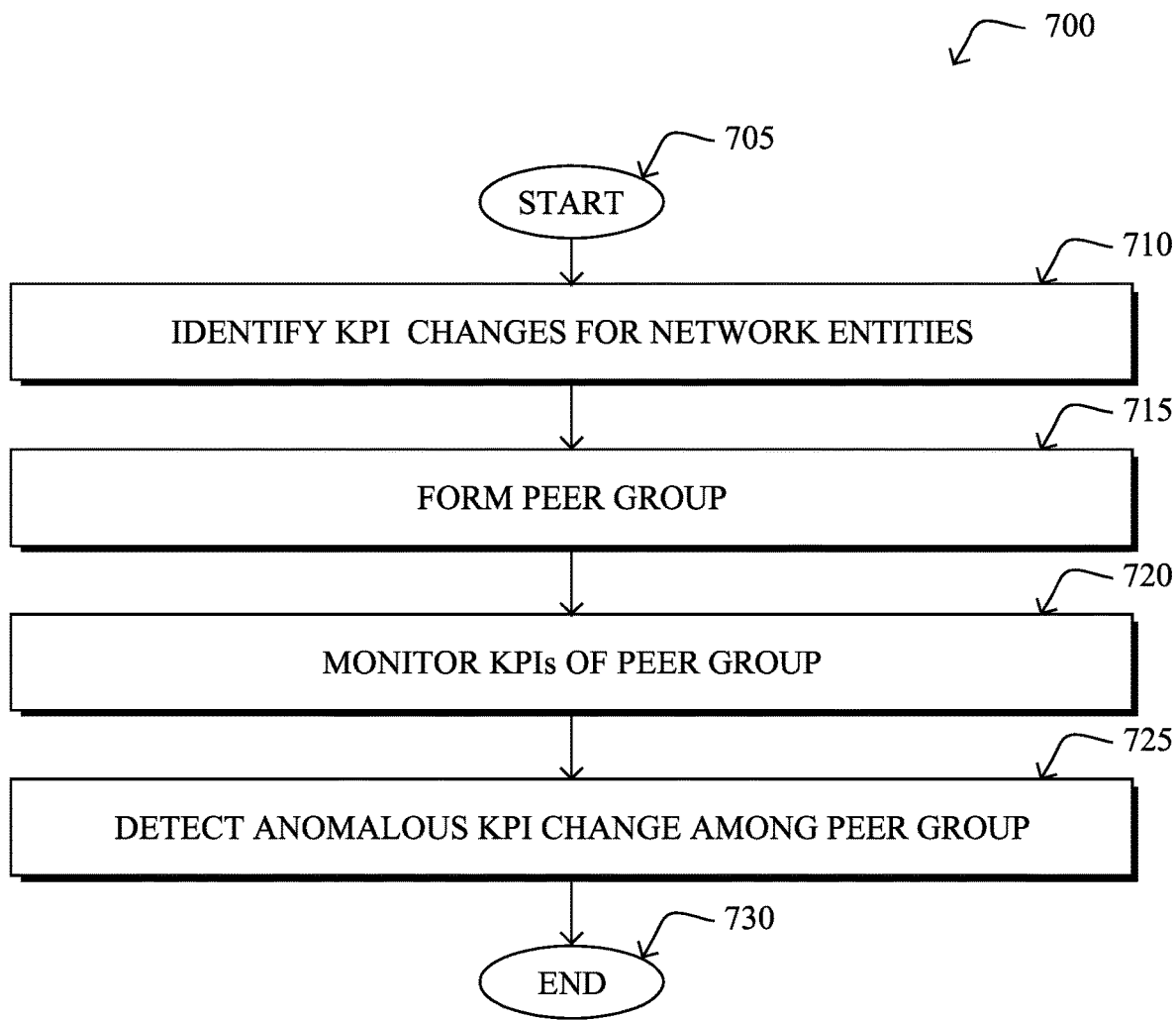
FIG. 7 illustrates an example simplified procedure for detecting an anomalous KPI change in a network.

FIG. 7 illustrates an example simplified procedure for detecting an anomalous KPI change, in accordance with one or more embodiments described herein. For example, a non-generic, specifically configured device (e.g., device 200) may perform procedure 700 by executing stored instructions (e.g., process 248), to function as a network assurance service for one or more monitored networks. The procedure 700 may start at step 705, and continues to step 710, where, as described in greater detail above, the network assurance service may identify changes in a KPI for each of a plurality of network entities in the one or more networks. Such KPIs may include, for example, utilization, client count, throughput, traffic, delays, loss, jitter, etc. The network entities may generally be any device or other entity that supports communications in the network such as APs, WLCs or other AP controllers, switches, routers, tunnels, etc., and/or logical entities, such as tunnels or links in the network.

At step 715, as detailed above, the network assurance service may form a peer group of network entities from the plurality of network entities whose changes in the key performance indicator are correlated. In one embodiment, the service may do so by applying clustering to the changes in the KPI for each of the plurality of network entities. For instance, the service may apply clustering to the KPI time-series of the network entities. In another case, the service may do compute a correlation matrix based on the changes in the KPI for each of the entities and apply spectral clustering to the correlation matrix, to form peer groups. In yet another embodiment, the service may form the peer group using machine learning to learn a function that matches any network entity to a set of peers.

At step 720, the network assurance service may monitor the KPI for the network entities in the peer group, as described in greater detail above. In other words, after forming the peer group, the network assurance service may continue to assess the KPI for each of the peers and its changes over time for each of the entities.

At step 725, as detailed above, the network assurance service may detect, based on the monitoring, an anomalous change in the key performance indicator for a particular network entity in the peer group of network entities relative to other network entities in the peer group of network entities. In one embodiment, the service may do so by inputting changes in the key performance indicator monitored for the network entities in the peer group of network entities to a machine learning model configured to identify anomalous changes among the peer group of network entities. In another embodiment, the service may do so by comparing a change in the key performance indicator for the particular network entity to an average or percentile of changes in the key performance indicator exhibited by the other network entities in the peer group of network entities. In turn, the device may provide data regarding the anomalous change in the KPI for the particular network entity to a user interface, such as by raising an alert. Procedure 700 then ends at step 730.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, introduce an approach that assesses changes in network KPIs and configurations while reducing false positives due to legitimate configuration rollouts or large-scale, business-induced change patterns which may be of limited interest. In some aspects, this is achieved by dynamically associating to each network entity a set of peers comparing the KPI change at the entity to the change(s) for each of its peers. When the entity has a change in its KPI that is not exhibited by its peers, this type of change is unexpected and, thus, possibly of higher interest to the network administrators.

While there have been shown and described illustrative embodiments that provide for the detection of isolated changes in network metrics using smart-peering, it is to be understood that various other adaptations and modifications may be made within the spirit and scope of the embodiments herein. For example, while certain embodiments are described herein with respect to using certain models for purposes of anomaly or change detection, the models are not limited as such and may be used for other functions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   identifying, by a network assurance service that monitors one or more networks, changes in a key performance indicator for each of a plurality of network entities in the one or more networks;
   forming, by the network assurance service, a peer group of network entities from the plurality of network entities whose changes in the key performance indicator over time are correlated;
   monitoring, by the network assurance service, the key performance indicator for network entities in the peer group of network entities; and
   detecting, by the network assurance service and based on the monitoring, an anomalous change in the key performance indicator for a particular network entity in the peer group of network entities relative to other network entities in the peer group of network entities by comparing changes in the key performance indicator for the particular network entity over a time period to changes in the key performance indicator for the other network entities over the time period.

2. The method as in claim 1, wherein the network entities comprise at least one of:
routers, switches, tunnels, wireless access points, or wireless access point controllers.

3. The method as in claim 1, wherein forming the peer group of network entities from the plurality of network entities whose changes in the key performance indicator are correlated comprises:
applying clustering to the changes in the key performance indicator for each of the plurality of network entities.

4. The method as in claim 1, wherein forming the peer group of network entities from the plurality of network entities whose changes in the key performance indicator are correlated comprises:
computing a correlation matrix based on the changes in the key performance indicator for each of the plurality of network entities in the one or more networks.

5. The method as in claim 1, wherein detecting the anomalous change in the key performance indicator for the particular network entity in the peer group of network entities relative to the other network entities in the peer group of network entities comprises:
inputting changes in the key performance indicator monitored for the network entities in the peer group of network entities to a machine learning model configured to identify anomalous changes among the peer group of network entities.

6. The method as in claim 1, wherein detecting the anomalous change in the key performance indicator for the particular network entity in the peer group of network entities relative to the other network entities in the peer group of network entities comprises:
comparing a change in the key performance indicator for the particular network entity to an average or percentile of changes in the key performance indicator exhibited by the other network entities in the peer group of network entities.

7. The method as in claim 1, wherein forming the peer group of network entities from the plurality of network entities whose changes in the key performance indicator are correlated comprises:
using a machine learning model to match the particular network entity to the other network entities.

8. The method as in claim 1, further comprising:
providing data regarding the anomalous change in the key performance indicator for the particular network entity to a user interface.

9. The method as in claim 1, wherein the key performance indicator comprises at least one of: utilization, client count, throughput, traffic, loss, latency, or jitter.

10. An apparatus, comprising:
one or more network interfaces;
a processor coupled to the one or more network interfaces and configured to execute one or more processes; and
a memory configured to store a process that is executable by the processor, the process when executed configured to:
identify changes in a key performance indicator for each of a plurality of network entities in one or more networks;
form a peer group of network entities from the plurality of network entities whose changes in the key performance indicator over time are correlated;
monitor the key performance indicator for network entities in the peer group of network entities; and
detect, based on the key performance indicator monitored for the network entities in the peer group of network entities, an anomalous change in the key performance indicator for a particular network entity in the peer group of network entities relative to other network entities in the peer group of network entities by comparing changes in the key performance indicator for the particular network entity over a time period to changes in the key performance indicator for the other network entities over the time period.

11. The apparatus as in claim 10, wherein the network entities comprise at least one of: routers, switches, tunnels, wireless access points, or wireless access point controllers.

12. The apparatus as in claim 10, wherein the apparatus forms the peer group of network entities from the plurality of network entities whose changes in the key performance indicator are correlated by:
applying clustering to the changes in the key performance indicator for each of the plurality of network entities.

13. The apparatus as in claim 10, wherein the apparatus forms the peer group of network entities from the plurality of network entities whose changes in the key performance indicator are correlated by:
computing a correlation matrix based on the changes in the key performance indicator for each of the plurality of network entities in the one or more networks.

14. The apparatus as in claim 10, wherein the apparatus forms the peer group of network entities from the plurality of network entities whose changes in the key performance indicator are correlated by:
inputting changes in the key performance indicator monitored for the network entities in the peer group of network entities to a machine learning model configured to identify anomalous changes among the peer group of network entities.

15. The apparatus as in claim 10, wherein the apparatus detects the anomalous change in the key performance indicator for the particular network entity in the peer group of network entities relative to the other network entities in the peer group of network entities by:
comparing a change in the key performance indicator for the particular network entity to an average or percentile of changes in the key performance indicator exhibited by the other network entities in the peer group of network entities.

16. The apparatus as in claim 10, wherein the apparatus detects the anomalous change in the key performance indicator for the particular network entity in the peer group of network entities relative to the other network entities in the peer group of network entities by:
applying time-series clustering to the key performance indicator monitored for network entities in the peer group of network entities.

17. The apparatus as in claim 10, wherein the process when executed is further configured to:
provide data regarding the anomalous change in the key performance indicator for the particular network entity to a user interface.

18. The apparatus as in claim 10, wherein the key performance indicator comprises at least one of: utilization, client count, throughput, traffic, loss, latency, or jitter.

19. A non-transitory computer-readable medium storing program instructions that cause a network assurance service that monitors one or more networks to execute a process comprising:

identifying, by the network assurance service, changes in a key performance indicator for each of a plurality of network entities in the one or more networks;

forming by the network assurance service, a peer group of network entities from the plurality of network entities whose changes in the key performance indicator over time are correlated;

monitoring, by the network assurance service, the key performance indicator for network entities in the peer group of network entities; and detecting, by the network assurance service and based on the monitoring, an anomalous change in the key performance indicator for a particular network entity in the peer group of network entities relative to other network entities in the peer group of network entities by comparing changes in the key performance indicator for the particular network entity over a time period to changes in the key performance indicator for the other network entities over the time period.

20. The computer-readable medium as in claim 19, wherein the key performance indicator comprises at least one of: utilization, client count, throughput, traffic, loss, latency, or jitter.

* * * * *

UNITED STATES PATENT AND TRADEMARK OFFICE
CERTIFICATE OF CORRECTION

PATENT NO. : 11,381,640 B2  
APPLICATION NO. : 16/875182  
DATED : July 5, 2022  
INVENTOR(S) : Pierre-André Savalle Page 1 of 2

It is certified that error appears in the above-identified patent and that said Letters Patent is hereby corrected as shown below:

In the Specification

Column 7, Line 51, please amend as shown:  
AP1 through nth access point, APn) through which endpoint Column 7, Line 66, please amend as shown:  
AP1 through nth access point APm) that provide connectiv- Column 10, Line 59, please amend as shown:  
(e.g., multiple wireless access points, AAA/DHCP servers, Column 11, Line 8, please amend as shown:  
rely on "knowing" that this is an intended user–initiated Column 11, Line 52, please amend as shown:  
Indeed, if the KPI changes for the network entity but not for Column 12, Line 51, please amend as shown:  
The above change measures may also be crafted with the Column 12, Line 52, please amend as shown:  
help of a subject matter expert (SME) or can be learned or Column 13, Line 48, please amend as shown:  
machine learning to learn a function that matches any network Column 14, Line 36, please amend as shown:  
may obtain at each time point, and for each KPI and network Signed and Sealed this  
Fourth Day of October, 2022

Katherine Kelly Vidal  
*Director of the United States Patent and Trademark Office*

Column 14, Line 37, please amend as shown:
entity 404, any changes detected by KPI change detector (s)

Column 14, Line 51, please amend as shown:
identify isolated/anomalous changes using a machine learn